(12) United States Patent
Yang et al.

(10) Patent No.: US 10,731,567 B2
(45) Date of Patent: Aug. 4, 2020

(54) MOUNT STRUCTURE FOR AN AIRCRAFT ANCILLARY ENGINE UNIT

(71) Applicant: ROLLS-ROYCE plc, London (GB)

(72) Inventors: Rong Yang, Derby (GB); David Isles, Derby (GB)

(73) Assignee: Rolls-Royce plc, London ( * ) Notice: Subject to any disclaimer, the term of this patent is extended or adjusted under 35 U.S.C. 154(b) by 236 days.

(21) Appl. No.: 15/834,868

(22) Filed: Dec. 7, 2017

(65) Prior Publication Data

US 2018/0171876 A1      Jun. 21, 2018

(30) Foreign Application Priority Data

Dec. 16, 2016 (GB) .................................... 1621455.3

(51) Int. Cl.
   *F02C 7/32*     (2006.01)
   *F16M 13/02*    (2006.01)
   (Continued)

(52) U.S. Cl.
   CPC ................ *F02C 7/32* (2013.01); *B33Y 80/00* (2014.12); *F01D 25/26* (2013.01); *F01D 25/28* (2013.01);
   (Continued)

(58) Field of Classification Search
   CPC ........ F02C 7/20; F02C 7/32; B64D 2041/002; B64D 27/26; B64D 2027/262;
   (Continued)

(56) References Cited

U.S. PATENT DOCUMENTS 2,650,050 A * 8/1953 Chandler .................. F02C 7/20
                                                    248/554
3,155,352 A    11/1964 Batt
               (Continued)

FOREIGN PATENT DOCUMENTS

EP        0080404          6/1983
EP        1719949 A2       11/2006
          (Continued)

OTHER PUBLICATIONS

Great Britain Search Report dated Jun. 15, 2017 issued in GB Patent Application No. 1621455.3.
(Continued)

*Primary Examiner* — Alain Chau
(74) *Attorney, Agent, or Firm* — Barnes & Thornburg LLP (57) ABSTRACT

A mount structure for mounting an ancillary engine unit to a gas turbine engine is provided. The mount structure has plural elongate struts which each extend from a connector portion at one end of the strut to a fastening portion at the other end of the strut. The housing of the ancillary engine unit is formed of a first material having a first coefficient of thermal expansion, and the elongate struts are formed of a second material having a second coefficient of thermal expansion. Each elongate strut extends away from its connector portion in a direction which is crosswise to the direction of the hypothetical differential thermal strain at that connector portion. The mount structure further has a containment bracket which is configured to contain each connector portion.

14 Claims, 8 Drawing Sheets

(51) Int. Cl.
  *B33Y 80/00* (2015.01)
  *F01D 25/26* (2006.01)
  *F02C 7/20* (2006.01)
  *F01D 25/28* (2006.01)
  *B64D 41/00* (2006.01)

(52) U.S. Cl.
  CPC .............. *F02C 7/20* (2013.01); *F16M 13/02* (2013.01); *B64D 2041/002* (2013.01); *F05D 2220/323* (2013.01); *F05D 2220/50* (2013.01); *F05D 2230/31* (2013.01); *F05D 2240/91* (2013.01); *F05D 2250/41* (2013.01); *F05D 2260/941* (2013.01); *F05D 2300/173* (2013.01); *F05D 2300/174* (2013.01); *F05D 2300/50212* (2013.01)

(58) Field of Classification Search
  CPC ..... B64D 2027/264; F05D 2300/50212; F05D 2300/173; F05D 2300/174; F05D 2250/41; F05D 2260/941; F05D 2220/323; F05D 2240/91; F01D 25/164; F01D 25/24; F01D 25/26; F01D 25/28; F16M 13/02; B33Y 80/00
  See application file for complete search history.

(56) References Cited

U.S. PATENT DOCUMENTS

| | | | | |
|---|---|---|---|---|
| 3,208,217 A * | 9/1965 | Sonder | ..................... | F02C 7/20 60/798 |
| 4,060,744 A * | 11/1977 | Starcevic | ................. | H02K 5/04 310/91 |
| 4,785,625 A * | 11/1988 | Stryker | ..................... | F02C 7/20 60/226.1 |
| 6,581,874 B2 * | 6/2003 | Lemire | .................. | B64D 41/00 244/54 |
| 7,618,007 B1 * | 11/2009 | Dahlgren | ............... | B64D 41/00 244/54 |
| 7,909,286 B2 * | 3/2011 | Martinez Rueda | .... | B64D 27/26 244/54 |
| 8,490,916 B2 * | 7/2013 | Olsen | ...................... | B64D 41/00 244/54 |
| 9,003,811 B2 * | 4/2015 | Barnett | .................. | F01D 15/10 60/796 |
| 9,637,239 B2 * | 5/2017 | Poisson | ..................... | F02C 7/20 |
| 10,001,136 B2 * | 6/2018 | Hayton | ..................... | F02C 7/00 |
| 10,081,431 B2 * | 9/2018 | Seack | ........................ | F28F 1/40 |
| 10,124,905 B2 * | 11/2018 | Barsali | .................. | B64D 41/00 |
| 10,399,693 B2 * | 9/2019 | Palomares Mora | ... | B64D 41/00 |
| 2002/0084381 A1 * | 7/2002 | Lemire | .................. | B64D 41/00 244/54 |
| 2007/0120037 A1 * | 5/2007 | Martinez Rueda | .... | B64D 27/26 248/637 |
| 2009/0308078 A1 * | 12/2009 | Foster | .................... | B64D 27/26 60/796 |
| 2009/0308972 A1 * | 12/2009 | Foster | .................... | B64D 27/26 244/54 |
| 2010/0038471 A1 * | 2/2010 | Olsen | ...................... | B64D 41/00 244/54 |
| 2011/0253878 A1 * | 10/2011 | Klahn | ....................... | B64C 7/00 248/636 |
| 2013/0092788 A1 * | 4/2013 | Olsen | ...................... | B64D 41/00 244/54 |
| 2013/0133336 A1 * | 5/2013 | Barnett | ................... | F01D 15/10 60/802 |
| 2014/0026585 A1 | 1/2014 | Baldwin | | |
| 2015/0050139 A1 * | 2/2015 | Hayton | ..................... | F02C 7/00 415/214.1 |
| 2016/0159486 A1 * | 6/2016 | Poisson | .................. | B64D 27/26 244/54 |
| 2016/0347464 A1 * | 12/2016 | Seack | ...................... | B64C 1/403 |
| 2016/0362189 A1 * | 12/2016 | Palomares Mora | ... | B64D 41/00 |
| 2018/0022468 A1 * | 1/2018 | Barsali | .................. | B64D 41/00 248/638 |

FOREIGN PATENT DOCUMENTS

| | | |
|---|---|---|
| EP | 2339144 A2 | 6/2011 |
| EP | 2399144 | 12/2011 |
| EP | 2607658 | 6/2013 |
| EP | 2796699 | 10/2014 |
| EP | 2796699 A1 | 10/2014 |
| JP | 2007064563 | 3/2007 |
| WO | 2015/065525 A1 | 5/2015 |
| WO | 2015065525 | 5/2015 |
| WO | 2015/191186 A1 | 12/2015 |

OTHER PUBLICATIONS

European Search Report completed on Apr. 23, 2018 and issued in connection with European Patent Application No. 17201810.3.

* cited by examiner

PRIOR ART

MOUNT STRUCTURE FOR AN AIRCRAFT ANCILLARY ENGINE UNIT

CROSS-REFERENCE TO RELATED APPLICATION

This application is based upon and claims the benefit of priority from British Patent Application No. 1621455.3 filed 16 Dec. 2016, the entire contents of which are incorporated herein.

BACKGROUND

1. Field of the Disclosure

The present invention relates to a mount structure for mounting an ancillary engine unit to a gas turbine engine.

2. Description of the Related Art

Gas turbine engine ancillary units often require brackets in order to be mounted to and space from relatively hot parts of the engine assembly, such as core engine casings. A problem arises, however, in that the thermal cycling imposed on the ancillary units and brackets by the operation of the engine can lead to the imposition of substantial cyclic stresses on the units and brackets because of differential thermal expansion effects.

In particular, the housings of engine ancillary units are often formed of aluminium alloy, which has a coefficient of thermal expansion (CTE) of about $23 \times 10^{-6}$ $K^{-1}$. However, aluminium alloy does not generally have sufficient strength at high temperature to be used to form the brackets, as these have to make direct contact with hot parts of the engine assembly. Thus brackets may be formed of titanium alloy (e.g. Ti 6Al 4V), which has a CTE of about $8.6 \times 10^{-6}$ $K^{-1}$. In a typical mounting location on a core engine casing air temperatures at the ancillary units may cycle by about 260° C. Accordingly, the connection between the aluminium alloy housing and the titanium alloy bracket has to be strong enough to repeatedly negate a difference in thermal strain of about $(23 \times 10^{-6} - 9 \times 10^{-6}) \times 260 = 3.64 \times 10^{-3}$. Since the two parts are constrained by suitable fasteners, and since they are typically in an unstressed state at the lowest point of the thermal cycle (i.e. room temperature, which is the usual engine build temperature), this subjects the aluminium alloy housing to compressive stress at elevated operating temperatures while the titanium alloy bracket experiences a tensile stress.

This tensile stress poses a significant risk where the bracket is subjected to cycles of temperature change over multiple engine operations, as the cycles of temperature change directly translate to cycles of stress in the bracket, increasing the risk of bracket failure by metal fatigue.

One option for dealing with the cyclic tensile loads is to increase the strength of the bracket by using more material in the bracket such that peak stress levels in the bracket are reduced. Another option is to form the bracket of a stronger alloy, such as a nickel-based superalloy. However, both these options undesirably increase the weight of the bracket. Also, reducing stresses at one part on the bracket may simply move the problem to another part of the bracket.

SUMMARY

Accordingly, in a first aspect, the present invention provides a mount structure for mounting an ancillary engine unit to a gas turbine engine; wherein the mount structure has plural elongate struts which each extend from a connector portion at one end of the strut to a fastening portion at the other end of the strut, the connector portion being rigidly mechanically connectable to a housing of the ancillary engine unit, and the fastening portion being rigidly mechanically fastenable to the engine; wherein the housing of the ancillary engine unit is formed of a first material having a first coefficient of thermal expansion, and the elongate struts are formed of a second material having a second coefficient of thermal expansion which is different to that of the first material, such that on thermal cycling of the engine, the housing and the struts would experience differential thermal strains at the connector portions if they were not rigidly mechanically connected to each other; wherein each elongate strut extends away from its connector portion in a direction which is crosswise to the direction of the hypothetical differential thermal strain at that connector portion so that the strut is more elastically compliant than the housing in that direction, thereby causing the strut to deflect to accommodate thermally-induced expansion and contraction of the housing on thermal cycling of the engine; and wherein the mount structure further has a containment bracket which is configured to contain each connector portion such that it is able to move substantially only in the direction of the hypothetical differential thermal strain at that connector portion.

Thus, rather than the strengthening the struts by adding material to the mount structure but thereby increasing the weight of the structure, the struts are configured in such a way as to have a reduced compliance in critical directions. In this way peak stress levels in the struts can be reduced while allowing the struts to cope with thermal growth of the housing of the ancillary engine unit. The containment bracket then helps to increase the stiffness of the mount structure in other directions. In particular, this increased stiffness can increase the first natural resonance frequency of the structure such that it is greater than the first order shaft vibration frequency of the high pressure shaft of the engine.

In a second aspect, the present invention provides a mount structure according to the first aspect to which an ancillary engine unit is mounted by rigidly mechanically connecting a housing of the ancillary engine unit to the connector portions of the mount structure, the housing being formed of a first material having a first coefficient of thermal expansion, and the elongate struts of the mount structure being formed of a second material having a second coefficient of thermal expansion which is different to that of the first material.

In a third aspect, the present invention provides a gas turbine engine to which is mounted the mount structure and the ancillary engine unit of the second aspect, the fastening portions of the mount structure being rigidly mechanically fastened to the engine. For example, the fastening portions of the mount structure may be rigidly mechanically fastened to a core casing of the engine.

In a fourth aspect, the present invention provides the use of additive layer manufacture to produce the elongate struts of the mount structure according to the first aspect.

Optional features of the invention will now be set out. These are applicable singly or in any combination with any aspect of the invention.

The connector portions may be rigidly mechanically connected to the housing of the ancillary engine unit by respective bolts. Similarly, the fastening portions may be rigidly mechanically fastened to the engine by respective bolts.

The average elastic compliance of the mount structure in the respective directions of the hypothetical differential thermal strain at the connector portions may be greater by a factor of at least 10 (and preferably greater by a factor of at least 15) than the average elastic compliance of the housing in the respective directions of the hypothetical differential thermal strain at the connector portions. The average elastic compliance of the mount structure in the respective directions of the hypothetical differential thermal strain at the connector portions may be greater by a factor of at most 30 (and preferably greater by a factor of at most 20) than the average elastic compliance of the housing in the respective directions of the hypothetical differential thermal strain at the connector portions.

Conveniently, the containment bracket also forms a platform for locating the ancillary engine unit.

Plural slots may be formed in the containment bracket, each slot surrounding a respective one of the connector portions, and each slot being orientated with its length direction aligned with the direction of the hypothetical differential thermal strain at its connector portion.

Conveniently, the elongate struts may be formed by additive layer manufacture, such as direct laser deposition or electron beam melting. The struts may have shapes that are difficult or uneconomical to form by other, more traditional, manufacturing techniques.

The elongate struts may be formed of titanium alloy, such as Ti 6Al 4V. The housing of the ancillary engine unit may be formed of aluminium alloy.

BRIEF DESCRIPTION OF THE DRAWINGS

Embodiments of the invention will now be described by way of example with reference to the accompanying drawings in which.

DETAILED DESCRIPTION

Figure 1:
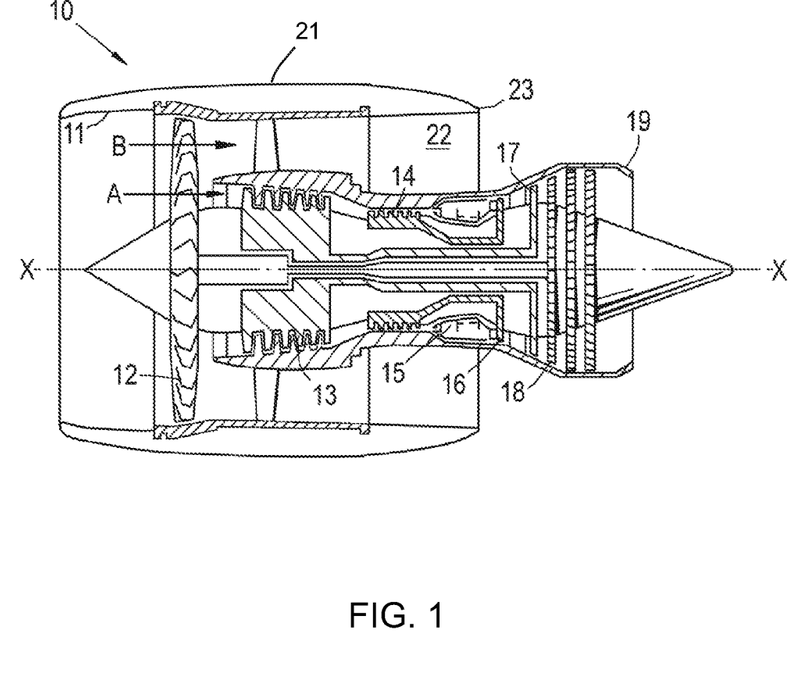
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 2:
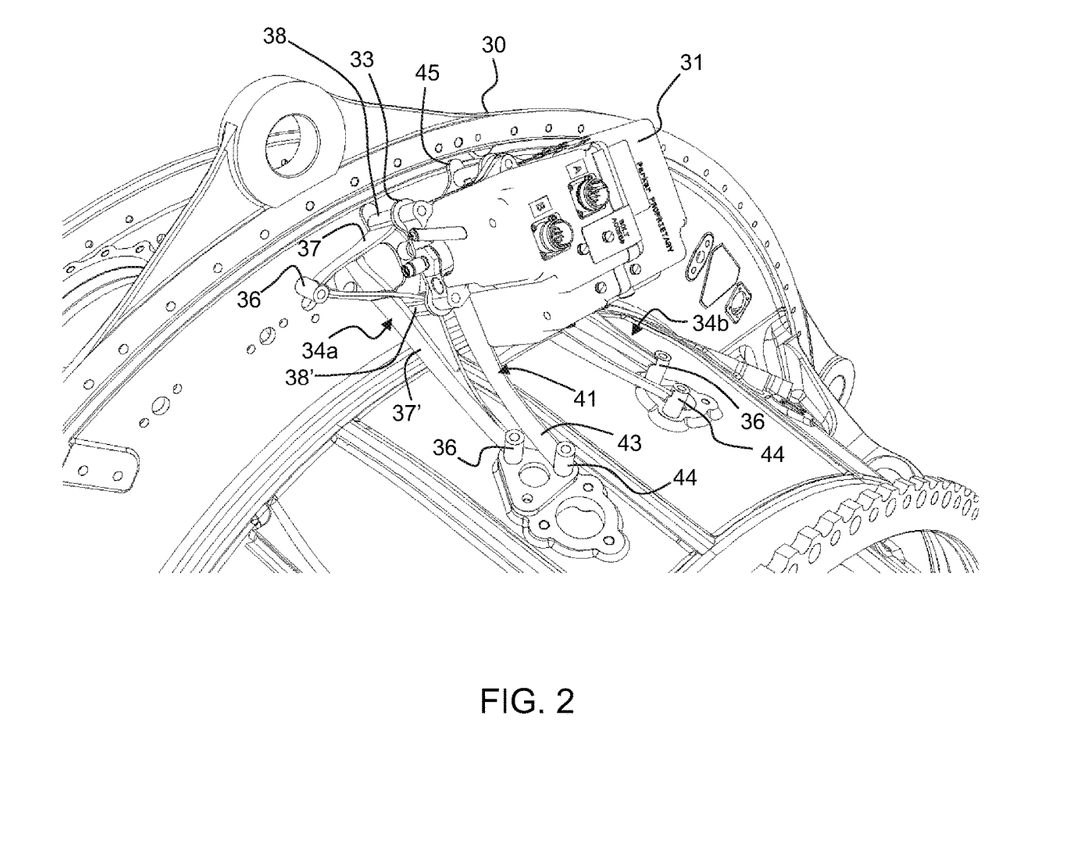
FIG. 2 shows a perspective view of a portion of a core casing of the engine to which is mounted an ancillary engine unit by a mount structure.
Figure 3:
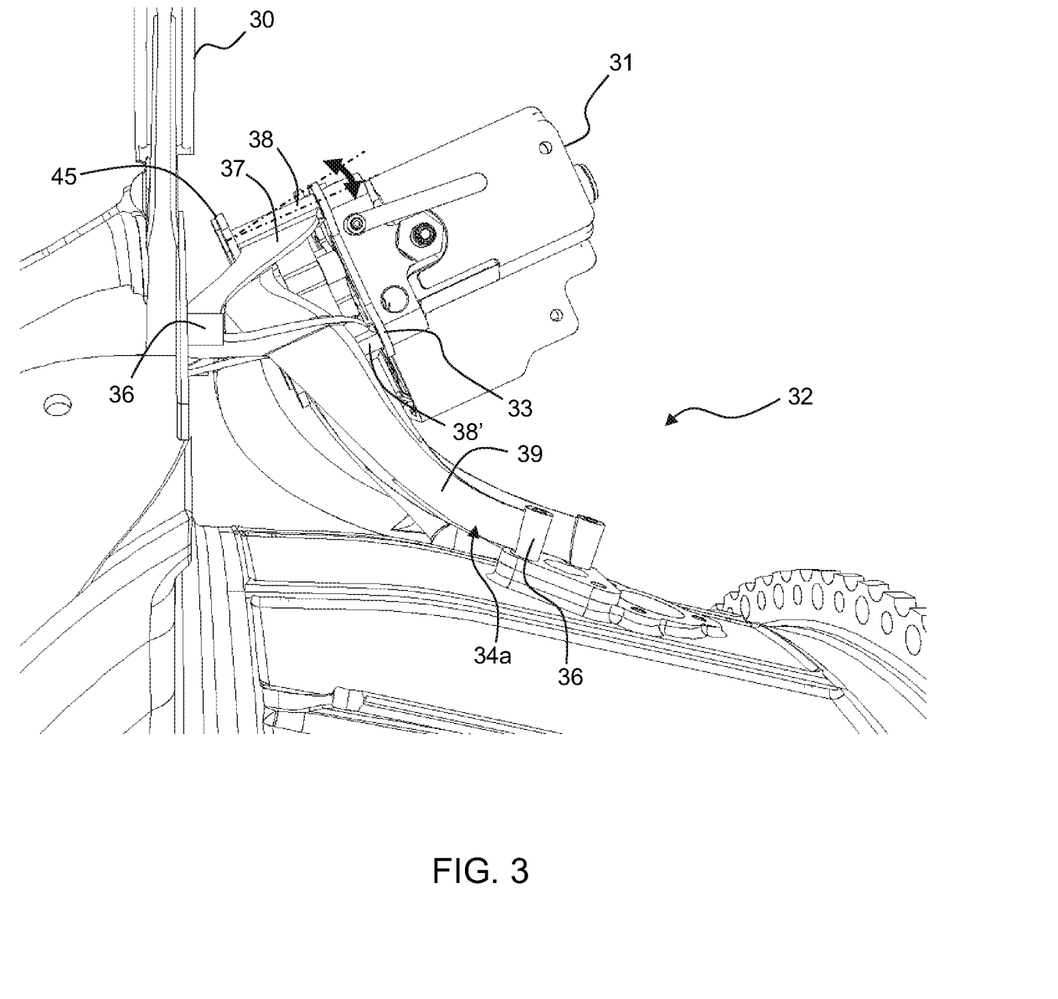
FIG. 3 shows a side view of the portion of the core casing, the ancillary engine unit and the mount structure of FIG. 2.
Figure 4:
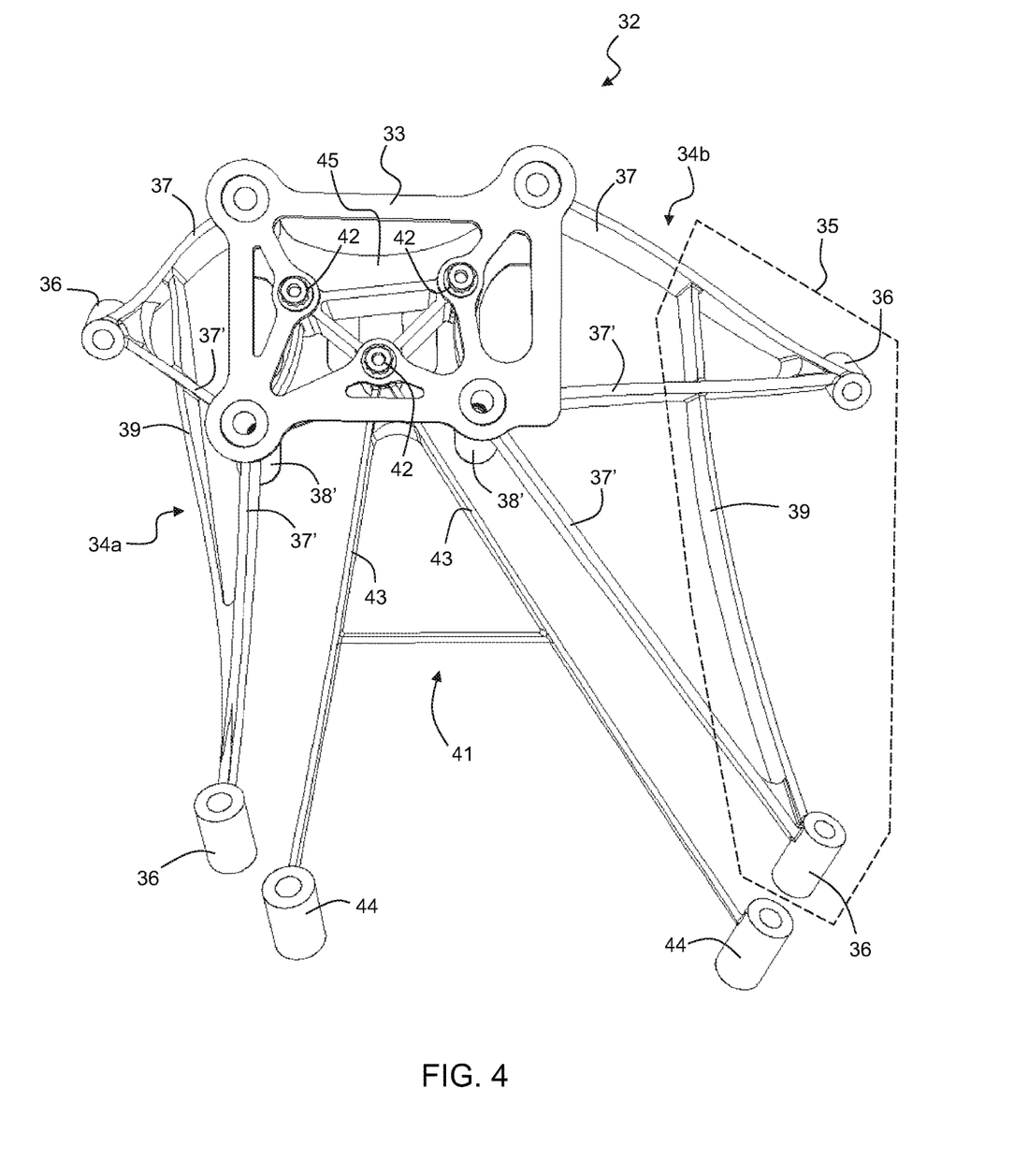
FIG. 4 shows a front view of the mount structure of FIGS. 2 and 3.

FIGS. 2 and 3 show respectively perspective and side views of a portion of a core casing 30 of the engine to which an ancillary engine unit 31 is mounted by a mount structure 32, and FIG. 4 shows a front view of just the mount structure. The ancillary engine unit has an aluminium alloy housing. The mount structure has a front containment bracket 33, and left 34a and right 34b support pieces, both formed from titanium alloy, such as Ti 6Al 4V.

The support pieces 34a, b are thin, lightweight and complex-shaped parts, which can conveniently be formed by additive layer manufacture (such as direct laser deposition or electron beam melting). Each support piece has a fastening portion 35 (indicated by a surrounding dotted line in FIG. 4 in respect of the right support piece 34b) having cylindrical fastening bosses 36 through which the piece is rigidly bolted to the casing 30.

Each support piece also has elongate struts 37, 37' which extend from connector portions in the form of further cylindrical bosses 38, 38' through which the piece is rigidly bolted to the housing of the ancillary engine unit 31 to the fastening portion 35. For example, the right support piece 34b, has two connector bosses: an upper one 38 which has one strut 37 extending therefrom, and a lower one 38' which has two struts 37' extending therefrom. The left support piece 34a has a similar arrangement of connector bosses and struts. The struts 37, 37' continue through the fastening portion to arrive at the fastening bosses. The fastening portion also has one or more elongate braces 39 which extend between the struts 37, 37' to stiffen the support piece in the fastening portion.

The upper 38 and lower 38' connector bosses of the support pieces 34a, b are contained within respective holes formed by the containment bracket 33. This bracket is made of titanium alloy, but being plate-like in shape can be manufactured by more conventional metal-forming processes than the support pieces.

The ancillary engine unit 31 is bolted to the support pieces 34a, b at the connector bosses 38, 38', with the containment bracket 33 acting as a platform for locating the unit. With the engine in its cold condition, the support pieces 34a, b are similarly bolted to the casing 30 at the fastening bosses 36.

During engine operation, the air temperature surrounding the unit 31 increases from about 20° C. when the engine is in its cold condition to about 280° C. when the engine is running. The CTE of the support pieces 34a, b is similar to that of the casing, and so this temperature rise does not produce significant stresses in the support pieces at the fastening bosses. In contrast, the CTE of the aluminium alloy of the ancillary engine unit 31 is significantly greater than that of the titanium alloy of the support pieces. Over repeated thermal excursions, this CTE mismatch, if not suitably addressed, could induce a cyclic tensile loading in the support pieces at or adjacent the connector bosses 38 which could lead to their premature fatigue failure.

Therefore in order to reduce this cyclic loading, at least some of the elongate struts 37 are configured such that they can deflect to accommodate the thermally-induced relative expansion and contraction of the housing of the ancillary engine unit 31. In particular, if the housing and the struts were not rigidly connected at the connector bosses 38, 38', the housing and the connector bosses would experience differential thermal strains along the directions indicated by the block arrows in FIG. 5, which is the same front view of the mount structure 32 as shown in FIG. 4, but including an enlarged view at the top right connector boss. To accommodate these relative strains in the housing, the uppermost strut 37 of the right support piece 34b and the uppermost strut 37 of the right support piece 34a extend away from their connector bosses 38 in directions which are crosswise to the directions of the differential thermal strains at those bosses. Therefore, because these struts are significantly more elastically compliant (e.g. by at least a factor of 10—see Appendix) than the housing in these directions, the thermally-induced relative expansion and contraction of the housing merely causes the struts to flex. In other words, each strut deflects relatively uniformly along its length, at least in the region between its connector boss, and its brace 39, such that high stress concentrations in the strut are avoided, while nonetheless enabling the connector boss at the end of the strut to move with the housing.

Figure 5:
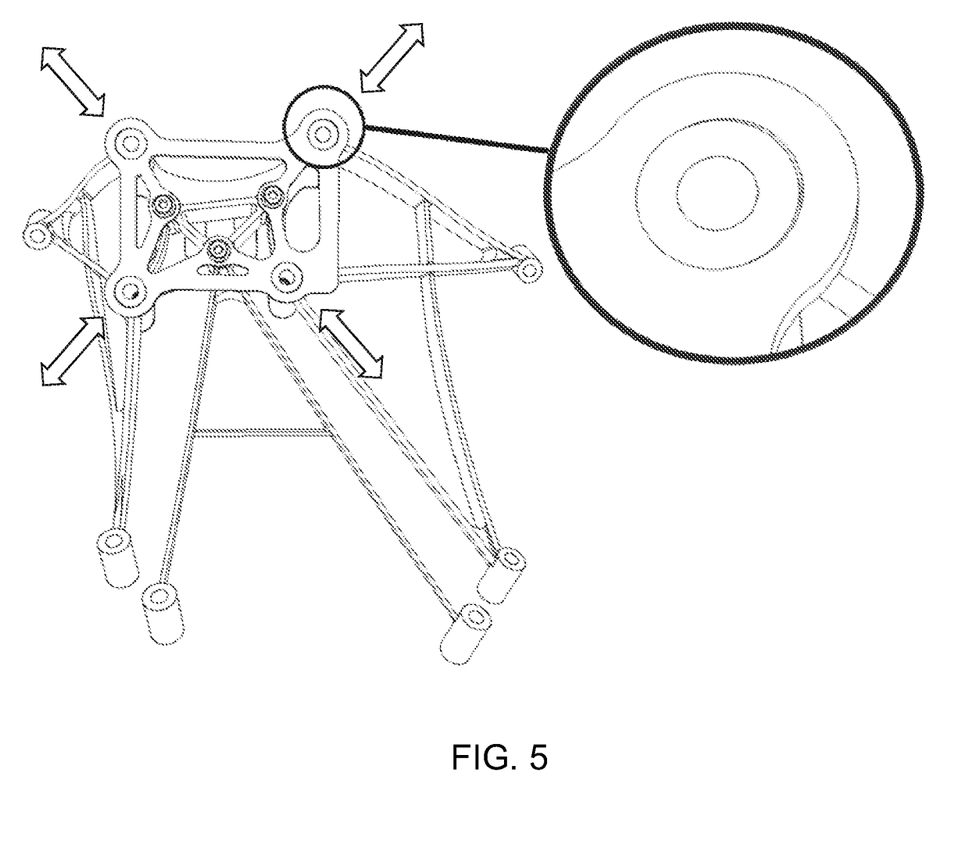
FIG. 5 shows a further front view of the mount structure of FIGS. 2 and 3, including an enlarged view at an upper right connector portion thereof.

The struts 37' extending from the lower right connector boss 38' of the right support piece 34b and the struts 37' extending from the lower left connector boss 38' of the left support piece 34a are, as a result of the way they are shaped, less easy to deflect (i.e. provide a reduced compliant) in the directions of the differential thermal strains at those bosses. However, as most of the thermal movement of the unit's housing can be accommodated by deflection of just the uppermost struts 37, it is generally desirable that the struts 37' extending from the lower connector bosses 38' are used to increase rather the overall stiffness of the mount structure 32. This is because increasing the overall stiffness can help to increase the first natural resonance frequency of the structure so that it is greater than the first order shaft vibration frequency of the high pressure shaft of the engine, and thus reduce vibration in the mount structure and the ancillary engine unit 31.

The containment bracket 33 also contributes to the overall stiffness of the mount structure 32. In particular, the holes which contain the upper 38 and lower 38' connector bosses of the support pieces 34a, b are shaped to allow only the necessary amount of thermally-induced relative movement of the unit's housing. Thus the hole for the upper right connector boss can be slot shaped with the long direction of the slot in the diagonal indicated by the respective block arrow in FIG. 5, and the hole for the upper left connector boss can also be slot shaped with the long direction of the slot in the diagonal indicated by the respective block arrow in FIG. 5. The non-circular nature of the hole for the upper right connector boss is just visible in the enlarged view of FIG. 5. As much less relative thermal movement occurs at the lower connector bosses, the holes in the bracket for these bosses may be closer to circular in shape. By reducing or eliminating relative movement of the connector bosses 38, 38', other than movement necessary to accommodate thermally-induced relative movement of the housing, the overall stiffness of the mount structure 32 can be further increased.

The mount structure 32 has a further stiffening/strengthening feature in the form of a central support piece 41 which joins at three bolting positions 42 to a central portion of the containment bracket 33. Two braced elongate struts 43 extend from a middle one of these bolting positions to respective cylindrical fastening bosses 44 through which the central support piece 41 is bolted to the casing 30. The central support piece can also conveniently be formed by additive layer manufacture.

Another stiffening/strengthening feature is a plate-like rear bracket 45, parallel to but spaced from the containment bracket 33 such that the connector bosses 38, 38' are sandwiched between the two brackets. The rear bracket can be manufactured by conventional metal-forming processes, and conveniently provides attachment threads for the bolts extending through the connector bosses 38, 38'. However, being spaced from the containment bracket the rear bracket does not substantially inhibit the relative thermal movement between the housing of the ancillary engine unit 31 and the containment bracket. Rather, as shown in FIG. 3 in respect of the upper left connector boss 38, the axis of the respective bolt can essentially pivot (as indicated by the block arrow) about the threads in the rear bracket due to the low compliance of the respective strut 37, exaggerated extreme pivot positions of the axis being indicated in FIG. 3 by dot-dashed lines.

Figure 6:
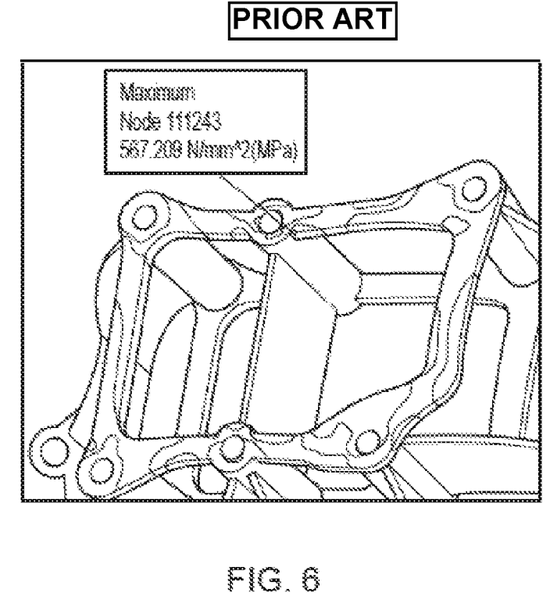
FIG. 6 shows finite element stress modelling results for a comparative example mount structure.
Figure 7:
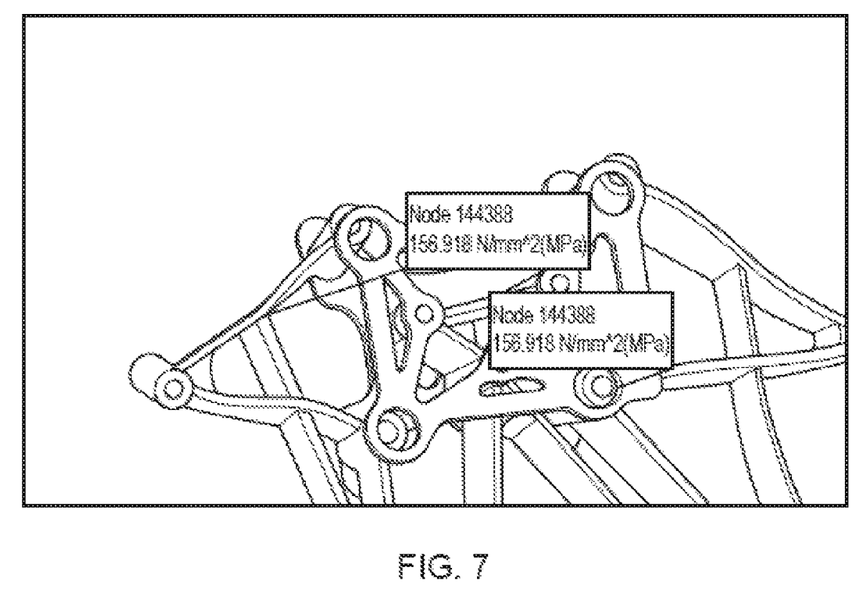
FIG. 7 shows finite element stress modelling results for the mount structure of FIGS. 2 to 5.

The effectiveness of the mount structure 32 at accommodating differential thermal movement is demonstrated by FIG. 6 which shows finite element stress modelling results for a comparative example mount structure and by FIG. 7 which shows finite element stress modelling results for the mount structure of FIGS. 2 to 5. The comparative example mount structure does not have the adaptations of the mount structure of FIGS. 2 to 5, such as the elongate struts 37 and the slot-shaped holes in the containment bracket 33. The results of FIG. 6 show a peak tensile stress of about 570 MPa in the front bracket of the comparative example mount structure to which the ancillary engine unit 31 is attached when the structure is exposed to a given thermal excursion. By comparison, for the same thermal excursion, the results of FIG. 7 show stresses transferred from the (front) containment bracket 33 to the rear bracket 45, and moreover the peak tensile stress (which now occurs in the lower right connector boss 38') reduced to about 280 MPa.

As discussed above, additive layer manufacture can conveniently be used to form the left 34a and right 34b support pieces and also the central support piece 41. A further advantage of using this technique is that allow the design of the pieces to be easily modified, e.g. to increase stiffness/strength in one direction and/or decrease it in another.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

Finite element analyses were performed on the titanium alloy mount structure 32 and the aluminium alloy housing of the ancillary engine unit 31 in order to determine the elastic compliance of the elongate struts 37 of the mount structure relative to the housing in the directions of the differential thermal strains at the connector bosses 38.

Elastic compliance is calculated from the inverse of the stiffness using the equation below:

$$C = \frac{1}{k} = \frac{\delta}{F} \quad \text{where:} \quad \begin{aligned} C &= \text{Elastic compliance (Pa}^{-1}\text{)} \\ k &= \text{Stiffness (Pa)} \\ \delta &= \text{Displacement (m)} \\ F &= \text{Force (N)} \end{aligned}$$

In a Method 1 analysis, the compliance was calculated by assigning a prescribed force to each bolted interface and using the solution output to determine the resulting displacement at each interface.

In a Method 2 analysis, the compliance was calculated by assigning a prescribed displacement to each bolted interface and using the solution output to determine the reaction force at each interface.

Both analyses assume that all reaction forces are transferred through the contact interfaces of the components.

Figure 8:
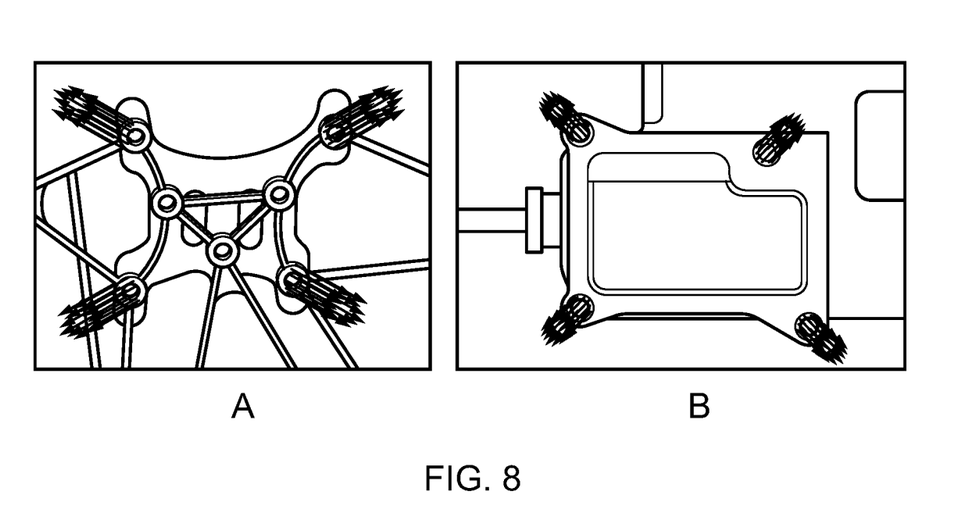
FIG. 8 shows finite element meshes for (A) a mount structure and (B) an ancillary engine unit housing in an analysis involving prescribed forces at bolted interfaces.

Method 1:

Meshes of both the mount structure and the ancillary unit were created and forces of 500 N applied to each bolted interface in the respective directions of expected expansion, as indicated in FIG. 8A-B. A force of 500 N was selected as the analysis predicts that the resultant displacement is similar to that experienced in service.

Figure 9:
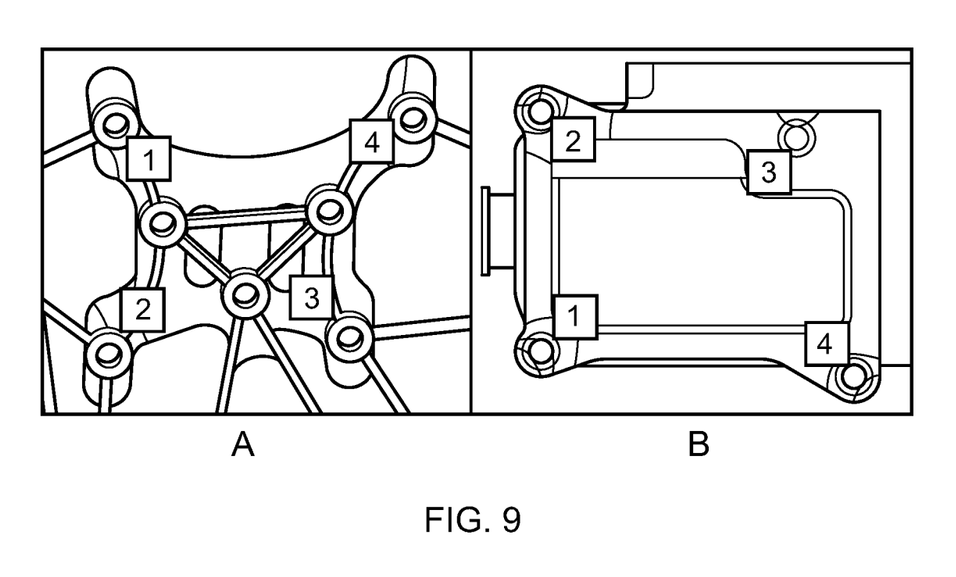
FIG. 9 shows solver outputs for (A) the mount structure and (B) the ancillary engine unit housing for the analysis of FIG. 8.

FIG. 9A-B shows the solver output for displacement magnitude, the four interfaces being numbered 1 to 4. The displacements identified from the solution are also shown in Table 1 below:

TABLE 1

| Interface | Displacement (mm) | |
|---|---|---|
| number | Mounting structure | Ancillary unit |
| 1 | 0.131 | 0.005 |
| 2 | 0.086 | 0.007 |
| 3 | 0.072 | 0.004 |
| 4 | 0.079 | 0.004 |
| Average (mean) | 0.092 | 0.005 |

Using these average displacements, the following relation factor calculation can be performed:

$$C_{Mounting\ structure} = \frac{\delta}{F} = \frac{0.092 \times 10^{-3}}{500} = 1.84 \times 10^{-7} Pa^{-1}$$

$$C_{Ancillary\ unit} = \frac{\delta}{F} = \frac{0.005 \times 10^{-3}}{500} = 1 \times 10^{-8} Pa^{-1}$$

$$\text{Relation factor} = \frac{C_{Mounting\ structure}}{C_{Ancillary\ unit}} = 18.4$$

Figure 10:
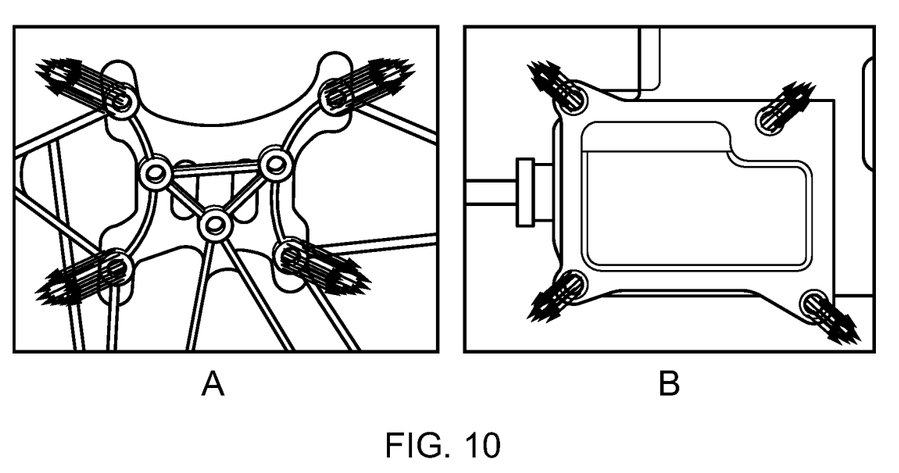
FIG. 10 shows finite element meshes for (A) the mount structure and (B) the ancillary engine unit housing in an analysis involving prescribed displacements at the bolted interfaces.
Figure 11:
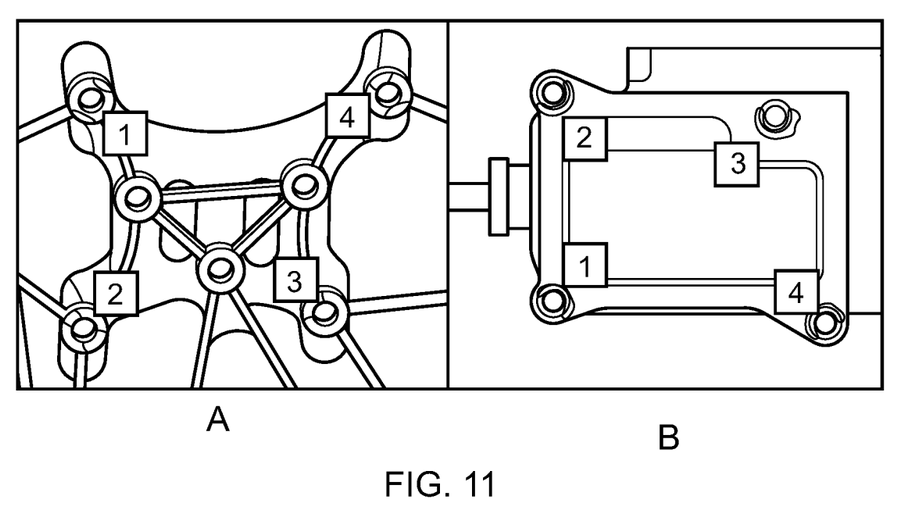
FIG. 11 shows solver outputs for (A) the mount structure and (B) the ancillary engine unit housing for the analysis of FIG. 10.

Method 2:

Meshes of both the mount structure and the ancillary unit were again created and displacements of 0.3 mm applied to each bolted interface in the respective directions of expected expansion, as indicated in FIG. 10A-B. FIG. 11A-B shows the solver output for force magnitude, the four interfaces again being numbered 1 to 4. The forces identified from the solution are also shown in Table 2 below:

TABLE 2

| Interface | Reaction force (N) | |
|---|---|---|
| number | Mounting structure | Ancillary unit |
| 1 | 2586 | 61334 |
| 2 | 3017 | 70756 |
| 3 | 4424 | 32095 |
| 4 | 3719 | 48245 |
| Average (mean) | 3437 | 53108 |

Using these average forces, the following relation factor calculation can be performed:

$$C_{Mounting\ structure} = \frac{\delta}{F} = \frac{0.3 \times 10^{-3}}{3437} = 8.73 \times 10^{-8} Pa^{-1}$$

$$C_{Ancillary\ unit} = \frac{\delta}{F} = \frac{0.3 \times 10^{-3}}{53108} = 5.65 \times 10^{-9} Pa^{-1}$$

$$\text{Relation factor} = \frac{C_{Mounting\ structure}}{C_{Ancillary\ unit}} = 15.5$$

DISCUSSION AND CONCLUSION

The analyses of Methods 1 and 2 provide values of 18.4 and 15.5 respectively for the relative average elastic compliances of the two components.

The forces applied using Method 1 produce an unbalanced overall resultant force, which resulted in higher magnitude displacements than expected due to overall bracket twist.

In reality the effect of thermal expansion induces a prescribed displacement into the mount structure rather than a prescribed force. Because of this, the analysis of Method 2 can be considered the more realistic of the two analyses. However, by providing a similar result, the analysis of Method 1 serves to validate the result of Method 2.

In general, we expect a relative average elastic compliance in the range from 10 to 30, and preferably from 15 to 20, to suitably reduce peak stress in the mount structure while retaining sufficient overall mount structure stiffness.

The invention claimed is:

1. A mount structure for mounting an ancillary engine unit to a gas turbine engine, the ancillary engine unit including a housing formed of a first material having a first coefficient of thermal expansion, the mount structure comprising:
a plurality of elongate struts which each extend from a connector portion at a first end of a respective elongate strut to a fastening portion at a second end of the respective elongate strut, each connector portion configured to be rigidly mechanically connected to the housing of the ancillary engine unit, and each fastening portion configured to be rigidly mechanically fastened to the gas turbine engine; and
a containment bracket,
wherein the plurality of elongate struts are formed of a second material having a second coefficient of thermal expansion which is different than the first coefficient of thermal expansion of the first material, such that on thermal cycling of the engine, the housing experiences a different thermal expansion and contraction than the plurality of elongate struts at the connector portions, wherein each elongate strut extends away from a respective connector portion in a first direction which is crosswise to a second direction of a radial thermal expansion or contraction of the housing at the respective connector portion, wherein the housing, at each connector portion, is configured to thermally expand and contract in a radial direction relative to a central axial axis of the housing, wherein the plurality of elongate struts are more elastically compliant than the housing in the second direction so as to cause at least one elongate strut to deflect about a pivot point to accommodate the radial thermal expansion and contraction of the housing at a respective connector portion on thermal cycling of the gas turbine engine, and wherein the containment bracket is configured to contain each connector portion such that each connector portion is movable substantially only in the second direction of the thermal expansion and contraction at the connector portion.

2. The mount structure according to claim 1, wherein a first elastic compliance of the mount structure in the second direction of the thermal expansion and contraction at each connector portion is greater by a factor of at least 10 than a second elastic compliance of the housing in the radial direction of the thermal expansion and contraction at each corresponding connector portion.

3. The mount structure according to claim 1, wherein the containment bracket forms a platform for locating the ancillary engine unit.

4. The mount structure according to claim 1, wherein:
a plurality of slots are formed in the containment bracket;
each slot surrounds an outer perimeter of a respective connector portion; and
each slot defines a first length that is (i) aligned with the second direction of the thermal expansion and contraction at the respective connector portion and (ii) greater than a second length of the respective connector portion that is aligned with the second direction.

5. The mount structure according to claim 1, wherein the plurality of elongate struts are formed by additive layer manufacture.

6. The mount structure according to claim 1, wherein the plurality of elongate struts are formed of titanium alloy.

7. The mount structure according to claim 1, wherein the housing of the ancillary engine unit is formed of aluminium alloy.

8. A gas turbine engine, comprising:
an ancillary engine unit including a housing;
a mount structure configured to mount the ancillary engine unit to the gas turbine engine, the mount structure including a plurality of elongate struts which each extend from a connector portion at a first end of a respective elongate strut to a fastening portion at a second end of the respective elongate strut, each connector portion rigidly mechanically connected to the housing of the ancillary engine unit, and each fastening portion rigidly mechanically fastened to the gas turbine engine; and
a containment bracket,
wherein the housing of the ancillary engine unit is formed of a first material having a first coefficient of thermal expansion, and the plurality of elongate struts are formed of a second material having a second coefficient of thermal expansion which is different than the first coefficient of thermal expansion of the first material, such that on thermal cycling of the engine, the housing experiences a different thermal expansion and contraction than the plurality of elongate struts at the connector portions, wherein each elongate strut extends away from a respective connector portion in a first direction which is crosswise to a second direction of a radial thermal expansion or contraction of the housing at the respective connector portion, wherein the housing, at each connector portion, is configured to thermally expand and contract in a radial direction relative to a central axial axis of the housing, wherein the plurality of elongate struts are more elastically compliant than the housing in the radial direction so as to cause at least one elongate strut to deflect about a pivot point to accommodate the radial thermal expansion and contraction of the housing at a respective connector portion on thermal cycling of the gas turbine engine, and wherein the containment bracket is configured to contain each connector portion such that each connector portion is movable substantially only in the second direction of the thermal expansion and contraction at the connector portion.

9. The gas turbine engine according to claim 8, wherein each fastening portion of the mount structure is rigidly mechanically fastened to a core casing of the gas turbine engine.

10. The mount structure according to claim 8, wherein the housing of the ancillary engine is located axially adjacent to the containment bracket.

11. The mount structure according to claim 8, further comprising:
at least one brace that extends between a point along a length of a respective elongate strut of the plurality of elongate strut and a fastening portion of a second elongate strut,
wherein the pivot point is located at an intersection of the at least one brace and the respective elongate strut such that the respective elongate strut deflects about the pivot point.

12. The mount structure according to claim 11, wherein:
the plurality of elongate struts includes a first, a second, a third, a fourth, a fifth, and a sixth elongate strut;
the first elongate strut extends from a first connector portion to a first fastening portion, and the second elongate strut extends from a second connector portion to the first fastening portion;
the third elongate strut extends from a third connector portion to a second fastening portion, and the fourth elongate strut extends from a fourth connector portion to the second fastening portion; and
the fifth elongate strut extends from the second connector portion to a third fastening portion, and the sixth elongate strut extends from the fourth connector portion to a fourth fastening portion.

13. The mount structure according to claim 12, wherein:
the at least one brace includes a first brace and a second brace;
the first brace extends from a point along a length of the first elongate strut to the third fastening portion; and
the second brace extends from a point along a length of the second elongate strut to the fourth fastening portion.

14. A mount structure for mounting an ancillary engine unit to a gas turbine engine, the mount structure comprising:
a plurality of elongate struts which each extend from a connector portion at a first end of a respective elongate strut to a fastening portion at a second end of the respective elongate strut, each connector portion configured to be rigidly mechanically connected to the housing of the ancillary engine unit, and each fastening portion configured to be rigidly mechanically fastened to the gas turbine engine; and wherein the housing of the ancillary engine unit is formed of a first material having a first coefficient of thermal expansion, and the plurality of elongate struts are formed of a second material having a second coefficient of thermal expansion which is different than the first coefficient of thermal expansion of the first material, such that on thermal cycling of the engine, the housing experiences a different thermal expansion and contraction than the plurality of elongate struts at the connector portions, wherein each elongate strut extends away from a respective connector portion in a first direction which is crosswise to a second direction of a radial thermal expansion or contraction of the housing at the respective connector portion, wherein the respective elongate strut is more elastically compliant than the housing in the second direction so as to cause the respective elongate strut to deflect about a pivot point to accommodate the radial thermal expansion and contraction of the housing at the connector portions on thermal cycling of the gas turbine engine, wherein the mount structure further has a containment bracket which is configured to contain each connector portion such that each connector portion is movable substantially only in the second direction of the thermal expansion and contraction at the connector portion, and wherein a first elastic compliance of the mount structure in the second direction of the thermal expansion and contraction at each connector portion is greater by a factor of at least 10 than a second elastic compliance of the housing in the radial direction of the thermal expansion and contraction at each corresponding connector portion.

* * * * *